United States Patent [19]
Mabuchi

[11] 3,921,470
[45] Nov. 25, 1975

[54] GEAR ASSEMBLY
[75] Inventor: Kenichi Mabuchi, Tokyo, Japan
[73] Assignee: Mabuchi Motor Co. Ltd., Tokyo, Japan
[22] Filed: May 31, 1974
[21] Appl. No.: 475,099

[30] Foreign Application Priority Data
June 11, 1973 Japan.......................... 48-65724

[52] U.S. Cl. .................................................. 74/414
[51] Int. Cl.² .......................................... F16H 1/06
[58] Field of Search...... 74/412 R, 414, 421 R, 434; 29/159.2

[56] References Cited
UNITED STATES PATENTS
3,011,358  12/1961  Moore............................ 74/421 R X
3,350,953  11/1967  Stewart............................. 74/412 X Primary Examiner—Leonard H. Gerin

[57] ABSTRACT

A gear assembly having flashes on the molded portions of one gear may be rendered fully operative by causing a pinion gear to engage with a portion of a second gear spaced from the edge of the gear on which a flash is formed during the molding process.

7 Claims, 5 Drawing Figures

U.S. Patent  Nov. 25, 1975  3,921,470
FIG. 1 (PRIOR ART)
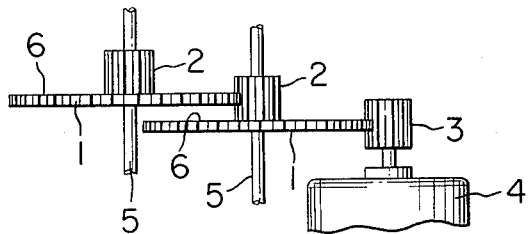
FIG. 2  FIG. 3
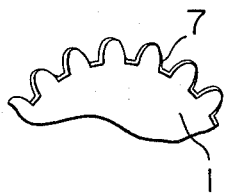  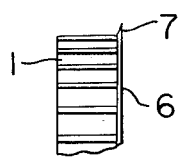
FIG. 4
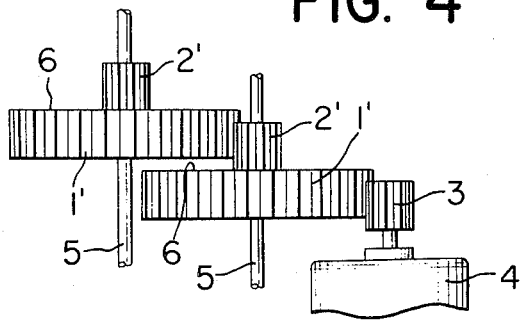
FIG. 5
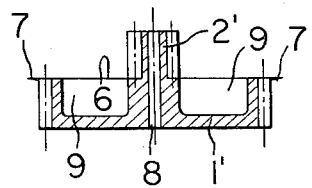

GEAR ASSEMBLY

BACKGROUND OF THE INVENTION

1. Field of the Invention

This invention relates generally to a gear assembly, and more specifically to a gear assembly comprising plastic molded gears, wherein a first gear meshes with a portion of a second gear spaced from an edge of the second gear having a flash formed during the molding operation.

2. Description of the Prior Art

Recently, molded plastic gears have been increasingly used in various products ranging from precision instruments such as watches and cameras to models and toys. In watches and cameras, for example, gears machined with high precision are used since these precision instruments require perfectly manufactured gears with a small module even if this means a relatively higher cost. However, in models and toys, where cost is a major limiting factor, gears of high precision and small module have not been successfully widely used. However, such small-module gears available at low cost are strongly needed in model and toy industries to meet the increased demand for small-sized gear assemblies.

When molding a gear from plastic, either of the two edges of the molded gear serves as a parting line for male and female molds, and consequently, a so-called flash develops along the abovementioned parting line during the molding operation. In the case of a large-module gear with flash, this can be used regardless of the flash merely by scraping off the flash and roughly finishing the surface. However, a small-module gear with only a tiny flash left on the surface could not be used at all because of the resultingly poor mesh engagement. For this reason, molded plastic gears of small module have been considered not applicable to models, toys and other essentially low-priced products.

SUMMARY OF THE INVENTION

This invention is based on the fact that either of the two edges of a molded plastic gear may be a parting line, resulting in a flash along the parting line. Both edges are never parting lines, and molded gears can have high precision tooth surfaces by improving the precision of the molds.

Accordingly, it is an object of the present invention to provide an inexpensive gear assembly having gear edges which can provide the abovementioned high precision teeth mesh engagement.

Another object of the present invention is to provide an inexpensive gear assembly using small module gears molded from plastic. Other objects and advantages of the present invention will become apparent from the following description thereof, with reference to the accompanying drawings.

BRIEF DESCRIPTION OF THE DRAWINGS

In the Drawings:

FIG. 1 shows the conventional configuration of a typical gear assembly;

FIGS. 2 and 3 show a typical flash formed on a molded plastic gear;

FIG. 4 shows a gear assembly embodying the present invention; and

FIG. 5 is a cross-sectional detailed view of an example of a gear used in the gear assembly shown in FIG. 4.

DETAILED DESCRIPTION OF THE EMBODIMENT

Referring now specifically to FIG. 1, a conventional gear assembly, comprises one or more spur gears 1, one or more pinion gears 2 integrally formed with the spur gears 1, a pinion gear 3 being fixed to a shaft of a motor 4, individual shafts 5 rotatably supporting the gears 1 and 2. The edge or parting line of the molds used to form the gears 1 and 2 is indicated at 6.

This figure shows a typical reduction gear assembly which reduces the rotational speed of the motor 4 through the intermeshing of the pinion gears 3 and 2 and spur gears 1.

When molding a spur gear in a gear assembly of this type using, for example, a mold, a flash 7 is formed along the edge 6 which serves as the parting line of the molds, as shown in FIGS. 2 and 3, and accordingly the meshing engagement of the gears becomes poor. Particularly, as the gear module is reduced to obtain a small-sized gear assembly, even a small amount of flash seriously affects the engagement of the gears. The module number, as it is called in the art, refers to the ratio of the gear diameter and number of teeth, plus a constant. In general, the smaller the module number of a gear, the closer is the tolerance required for the tooth surfaces.

FIGS. 2 and 3 show clearly a flash 7 formed on the edge 6 of a molded plastic gear. Generally, when a gear is molded by joining male and female molds, there is a thin gap at the interface, or parting line, of these molds and a so-called flash is formed in the gap. This type of flash is unavoidable with gears manufactured at low cost, especially gears of small module, and the flash 7 formed on the edge 6 as shown in FIG. 3 affects seriously the intermeshing of the gears, so much so that they cannot be considered fit for use.

For this reason, a choice is usually made either between designing a gear of larger module as described above, or manufacturing a gear of higher precision at higher cost.

FIG. 4 shows an embodiment of this invention, wherein the surface width of spur gears 1' is increased, and the engagement of the gears 1' with pinion gears 2' and 3 at the edges 6 which served as parting lines, resulting in the flash 7, is avoided. The gears thereby engage well.

By doing so, no trouble is caused with the engagement of the spur gears 1' with the pinion gear 2' and 3 even if a heavy flash is formed on the abovementioned edges 6. Thus, adequate engagement becomes possible even when gears of small module are manufactured by a molding operation. In addition, the entire gear assembly can be manufactured at low cost since close tolerance is not required either in the manufacture of the molds or in the molding operation.

FIG. 5 is a sectional view of gears used in the gear assembly shown in FIG. 4, in which the spur gear 1' and the pinion gear 2' are integrally molded, with a shaft bore 8 in common. In manufacturing this assembly, a female mold having a recess correspondingly to the circumferential shape of the spur gear 1' and a male mold having a projection corresponding to an inner cavity 9 of the spur gear 1' as well as a recess corresponding to the circumferential shape of the pinion gear 2' are abutted together at the parting line 6. Consequently, a flash 7 tends to be formed along the parting line 6 when the accuracy of the molds is poor.

As described with reference to FIG. 4, however, the pinion gear 2' and the spur gear 1' are brought into mesh with each other averting the flash 7 which might have been formed at the parting line 6, so that the intermeshing of these gears is acceptible. As mentioned above, this invention has distinct advantages, especially when used in applications such as models and toys, where gears with some flash can be used satisfactorily, and where small sized and inexpensive gear assemblies can be manufacured.

As shown in FIG. 5, when spur gear 1' and pinion gear 2' are integrally molded, the portions of the gears 1' and 2', which do not serve as parting lines, are, of course, molded with high precision depending on the accuracy of the molds. Thus, when engaged as shown in FIG. 4, the flash 7 which may have been formed at the parting line 6 does not impede the proper meshing of the gears.

Numerous changes may be made in the above described gear assembly, and different embodiments of the present invention may be had without departing from the scope thereof. Therefore, it is intended that all matter contained in the foregoing description and in the accompanying drawings be interposed as illustrative of the invention and not in a limiting sense.

What is claimed is:

1. A low module gear assembly comprising a first molded gear and a second gear, said first gear having a width dimension defined by two axially spaced apart transverse edges wherein at least one transverse edge has a flash formed thereon during the molding process, and said second gear meshes operatively only with that portion of the width dimension of said first gear that does not have said flash thereon and said entire second gear is axially spaced from said transverse edge of said first gear having said flash thereon.

2. A gear assembly according to claim 1, in which said second gear is molded.

3. A gear assembly according to claim 1, in which said first gear is made of plastic.

4. A gear assembly according to claim 1, in which said second gear is a pinion gear.

5. A gear assembly according to claim 1, comprising first, second, third and fourth gears, said second and fourth gears being pinion gears, said first and third gears being spur gears, said third gear meshing with said second gear and said first gear meshing with a pinion gear rotating on the shaft of of the gear assembly drive.

6. A gear assembly according to claim 5, in which said first and second gears are integrally formed by molding, and said third and fourth gears are similarly integrally formed by molding.

7. A gear according to claim 5, in which the edge of said first gear having a flash thereon is that which is closest to said second gear.

* * * * *